US012810022B2

(12) United States Patent
Mohling et al.

(10) Patent No.: US 12,810,022 B2
(45) Date of Patent: Nov. 24, 2026

(54) SYSTEMS AND METHODS FOR USING IMAGING ANALYSIS TO SECURELY DISPLAY MULTIPLE VIEWS OF INFORMATION

(71) Applicant: Capital One Services, LLC, McLean, VA (US)

(72) Inventors: Zachary Mohling, Arlington, VA (US); Griffin Stout, Arlington, VA (US); Kyle Marek, Arlington, VA (US); Michael Davis, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 108 days.

(21) Appl. No.: 18/882,090

(22) Filed: Sep. 11, 2024

(65) Prior Publication Data

US 2026/0073072 A1 Mar. 12, 2026

(51) Int. Cl.
*G06F 21/62* (2013.01)
*G06F 3/147* (2006.01)

(52) U.S. Cl.
CPC .......... *G06F 21/6245* (2013.01); *G06F 3/147* (2013.01)

(58) Field of Classification Search
None
See application file for complete search history.

(56) References Cited

U.S. PATENT DOCUMENTS 8,149,358 B2 4/2012 Takatani et al.
2005/0038743 A1* 2/2005 Stanley ................ G06Q 20/102 705/40
2010/0002079 A1* 1/2010 Krijn ........................ G09F 19/14 348/148
2013/0063457 A1* 3/2013 Borgers ............... G09G 3/3648 345/530
2017/0185980 A1* 6/2017 Wurmfeld .......... G06Q 20/1085
2018/0252949 A1 9/2018 Klippstein et al.

OTHER PUBLICATIONS

"Parallel Reality™ Displays are enabled by a new pixel that has unprecedented capabilities", MisappliedSciences, https://www.misappliedsciences.com/home/technology.html, Retrieved Aug. 26, 2024, 7 pages.
Scott Kramer, "Delta Air Lines Wows With Parallel Reality", Forbes, https://www.forbes.com/sites/scottkramer/2022/10/19/delta-airlines-wows-with-parallel-reality/?sh=82057838e97c, Retrieved Aug. 26, 2024, 4 pages.

* cited by examiner

*Primary Examiner* — Syed A Roni
(74) *Attorney, Agent, or Firm* — Bookoff McAndrews, PLLC

(57) ABSTRACT

Systems and methods disclosed may include receiving verification information from a user via a graphical user interface (GUI) and capturing visual information of the user via at least one imaging sensor. A viewing angle of the user may be continuously determined and based on the captured visual information. Upon determining that the verification information is valid, the method may include causing a display to output the account information and other information where the account information is displayed at the continuously determined viewing angle of the user, and the other information may be displayed at one or more viewing angles other than the continuously determined viewing angle of the user.

20 Claims, 4 Drawing Sheets

SYSTEMS AND METHODS FOR USING IMAGING ANALYSIS TO SECURELY DISPLAY MULTIPLE VIEWS OF INFORMATION

TECHNICAL FIELD

Various embodiments of the present disclosure relate generally to display systems, and, more particularly, to securely displaying account information to a user.

BACKGROUND

Automated teller machines (ATMs) are often location in public places and provide convenience to owners of checking or savings accounts that wish to perform basic banking functions. In the process of performing these banking transactions, private information is often required for authentication, and sensitive information is often displayed. Because ATMs are often in the open, bystanders may also be able to see private information that is displayed on an ATM.

When bystanders are able to view private or sensitive information displayed on an ATM, the account owner is exposed to a variety of security risks ranging from potential theft to identity fraud. For example, bystanders may be able to view sensitive information such as the owner's account balance, transaction history, or partial or full card numbers, which they may latter use to access and transfer funds. Or a bystander may covertly observe a personal identification number (PIN) entered by the account owner which could lead to unauthorized access of accounts and subsequent theft by making fraudulent transactions. Identity theft may also occur as enough information gleaned from the display may allow criminals to impersonate the account owner and potentially access other personal accounts or services tied to a compromised card or information. In addition, certain situations may pose physical threats as a criminal may view information to identify account owners withdrawing significant amounts of cash and attempt to rob them after the customer leaves.

Thus, there exists a need to address these privacy and security concerns. The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for a display system that securely displays account information to a user.

In some aspects, the techniques described herein relate to a method for securely displaying account information, the method including: receiving verification information from a user via a graphical user interface (GUI); capturing visual information of the user via at least one imaging sensor; continuously determining a viewing angle of the user based on the captured visual information; and upon determining that the verification information is valid, causing a display to output the account information, the output limited to the continuously determined viewing angle. In some aspects, the techniques described herein relate to a method, further including: determining a presence of at least one other individual, based on the captured visual information; determining at least one viewing angle of the at least one other individual; and further limiting the output of the account information such that the account information is not visible at the at least one viewing angle of the at least one other individual. In some aspects, the techniques described herein relate to a method, further including: causing the display to output other information at viewing angles other than the continuously determined viewing angle of the user. In some aspects, the techniques described herein relate to a method, wherein the other information is false information, the false information determined based on one or more predetermined criteria. In some aspects, the techniques described herein relate to a method, wherein the false information includes a false name of the user, a false account number, or a reduced account balance of the user. In some aspects, the techniques described herein relate to a method, wherein the other information includes truncated information or obfuscating information. In some aspects, the techniques described herein relate to a method, wherein the other information includes a message. In some aspects, the techniques described herein relate to a method, further including: identifying whether the account information includes one or more of a first portion of non-private information or a second portion of private information; and wherein the output of the account information is limited to the second portion of private information. In some aspects, the techniques described herein relate to a method, further including: determining a presence of an individual other than the user, based on the captured visual information, wherein the output includes a request that the user identify whether the individual captured by the at least one imaging sensor is authorized to view the account information; and upon receiving, via the GUI, user input verifying that the individual is authorized to view the account information: continuously determining a viewing angle of the individual based on the captured visual information; and causing the display to output the account information at the continuously determined viewing angle of the individual. In some aspects, the techniques described herein relate to a method, further including: determining, by a graphics controller software, at least one emitting direction and at least one emitting property for each pixel of the GUI, the at least one emitting direction and the at least one emitting property based on the continuously determined viewing angle of the user.

In some aspects, the techniques described herein relate to a method for securely displaying account information, the method including: receiving verification information from a user via a graphical user interface (GUI); capturing visual information of the user via at least one imaging sensor; continuously determining a viewing angle of the user based on the captured visual information; and upon determining that the verification information is valid, causing a display to output the account information and other information, the account information displayed at the continuously determined viewing angle of the user, the other information displayed at one or more viewing angle other than the continuously determined viewing angle of the user. In some aspects, the techniques described herein relate to a method, further including: determining a presence of at least one other individual, based on the captured visual information; determining at least one viewing angle of the at least one other individual; and further limiting the output of the account information such that the account information is not visible at the at least one viewing angle of the at least one other individual. In some aspects, the techniques described herein relate to a method, wherein the other information is false information, the false information determined based on one or more predetermined criteria. In some aspects, the techniques described herein relate to a method, wherein the false information includes a false name of the user, a false account number, or a reduced account balance of the user. In some aspects, the techniques described herein relate to a method, wherein the other information includes a message. In some aspects, the techniques described herein relate to a method, wherein the output displayed at the continuously determined viewing angle of the user includes instructions to the user; and based on the at least one imaging sensor or GUI detecting the user completing the instruction, transmitting a silent alarm notification. In some aspects, the techniques described herein relate to a method, further including: determining a presence of an individual other than the user, based on the captured visual information, wherein the output includes a request that the user identify whether the individual captured by the at least one imaging sensor is authorized to view the account information; and upon receiving, via the GUI, user input verifying that the individual is authorized to view the account information: continuously determining a viewing angle of the individual based on the captured visual information; and causing the display to output the account information at the continuously determined viewing angle of the individual. In some aspects, the techniques described herein relate to a method, further includes: determining, by a trained machine learning model, the other information to display based on historical information, wherein the other information is predicted to minimize a risk of the user being targeted by a threatening individual. In some aspects, the techniques described herein relate to a method, further including: based on the captured visual information via the at least one imaging sensor, determining a person other than the user, based on predetermined criteria, is predicted to be a threat.

In some aspects, the techniques described herein relate to a system for securely displaying account information, the system including: a data storage device storing instructions for displaying account information in an electronic storage medium; at least one imaging sensor; a display; and a processor operatively connected to the data storage device, the at least one imaging sensor, and the display, and configured to execute the instructions to perform a method including: receiving, at a graphical user interface (GUI) of the display, verification information from a user; capturing, by the at least one imaging sensor, visual information of the user; continuously determining, by the processor, a viewing angle of the user based on the captured visual information; and upon determining that the verification information is valid, causing the GUI to output the account information and other information, the account information displayed at the continuously determined viewing angle of the user, the other information displayed at one or more viewing angle other than the continuously determined viewing angle of the user.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that ATM users may be able to securely view information with privacy and without interference to their user experience.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
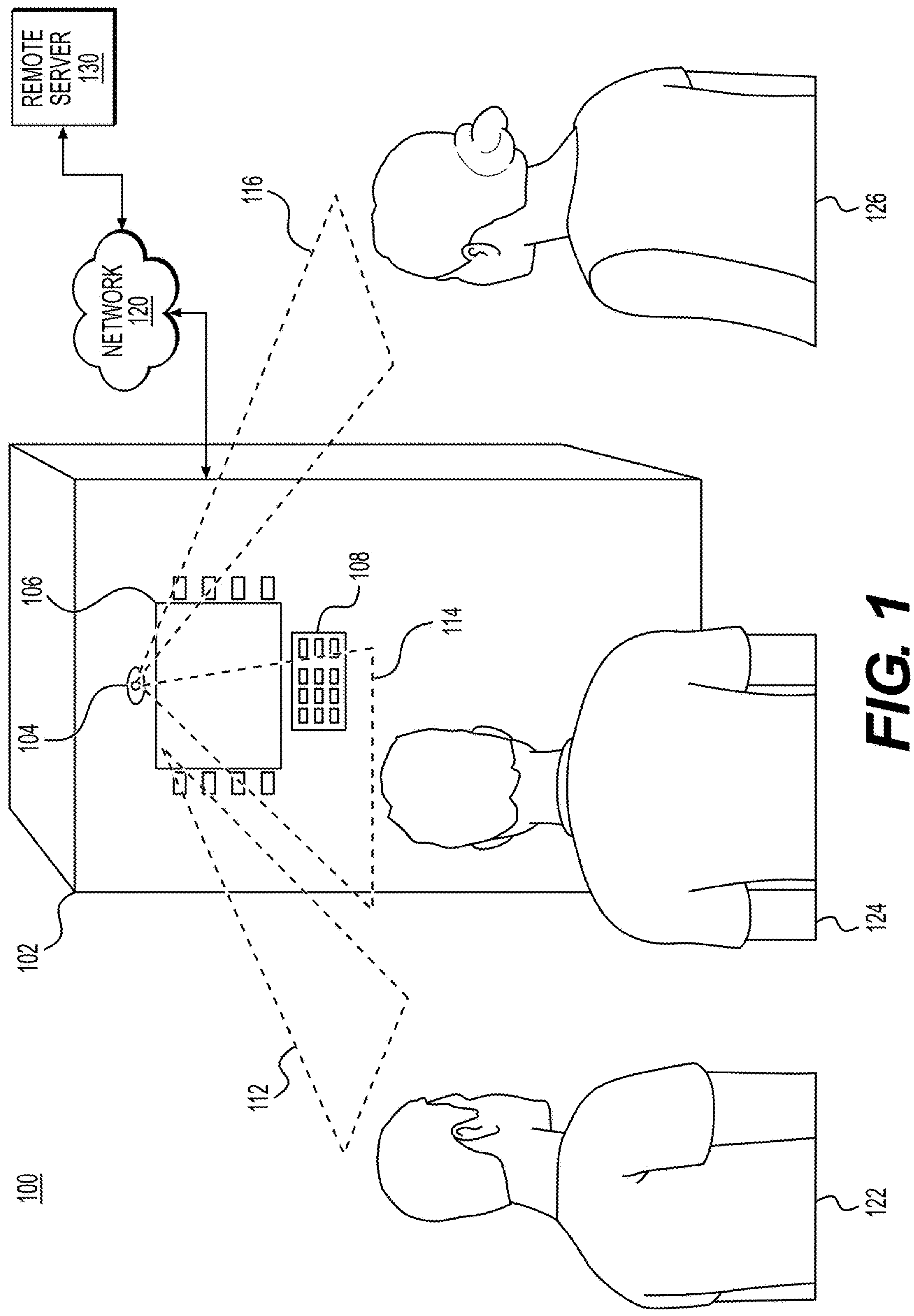
FIG. 1 depicts an exemplary ATM display environment, according to one or more embodiments.

According to certain aspects of the disclosure, methods and systems are disclosed for securely displaying account information to an ATM user, e.g., by collecting image data and using machine learning to display sensitive information at a viewing angle specific to the user. Conventional ATMs display information to users, but may not account for bystanders, and generally display information on a screen that may be viewed by all that are in close proximity. These conventional techniques may not be suitable for users that want to keep information private from the public bystanders. Accordingly, improvements in technology relating to securely displaying private information are needed.

As will be discussed in more detail below, in various embodiments, systems and methods are described for using image data and machine learning to securely display information at multiple views. By training a machine-learning model, e.g., via supervised or semi-supervised learning, to learn associations between trained image data and captured image data, the trained machine-learning model may be usable to securely display information.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term “based on” means “based at least in part on.” The singular forms “a,” “an,” and “the” include plural referents unless the context dictates otherwise. The term “exemplary” is used in the sense of “example” rather than “ideal.” The terms “comprises,” “comprising,” “includes,” “including,” or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially," "approximately," "about," and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, a "machine-learning model" generally encompasses instructions, data, or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model is generally trained using training data, e.g., experiential data or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration. By virtue of such training, a machine-learning model is converted from an un-trained and un-specific model to a model that is unique to and specifically configured for the particular purpose for which it is trained. In an example, training of a machine-learning model is analogous to a method of production in which the article produced is the trained model having unique characteristics by virtue of its particular training. Moreover, the result of training a machine-learning model using particular training data and for a particular purpose results in a technical solution to an inherently technical problem.

The execution of the machine-learning model may include deployment of one or more machine learning techniques, such as linear regression, logistical regression, random forest, gradient boosted machine (GBM), deep learning, or a deep neural network. Supervised or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

Various embodiments of the present disclosure relate generally to automated teller machines (ATMs) display systems and, more particularly, using imaging analysis to securely display multiple views of information. Any suitable system infrastructure may be put into place to analyze images to securely display multiple views of information in an ATM environment. FIG. 1 and the following discussion provide a brief, general description of a suitable ATM environment in which the present disclosure may be implemented. In one embodiment, any of the disclosed systems, methods, or graphical user interfaces may be executed by or implemented by an ATM system consistent with or similar to that depicted in FIG. 1. Although not required, aspects of the present disclosure are described in the context of computer-executable instructions, such as routines executed by a data processing device, e.g., a server computer, wireless device, or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, multi-processor systems, microprocessor-based or programmable consumer electronics, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer or data processor that is specifically programmed, configured, or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), or the Internet. Similarly, techniques presented herein as involving multiple devices may be implemented in a single device. In a distributed computing environment, program modules may be located in both local or remote memory storage devices.

Aspects of the present disclosure may be stored or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

In an example, a user may wish to perform banking transaction at an ATM, such as a cash withdrawal. The user may insert an ATM card with an accompanying pin number. After the user is verified, an ATM may display private user information on a display screen to assist the user with the transaction. For example, the display may show multiple bank accounts and the total amount of money that is in each bank account. This may be problematic because other people may also be able to view the displayed information. Usually, a user would not want bystanders to know what type of bank account they have or how much money is in each account. This and other types of information may be sensitive. In addition, a bystander may be able to view login or verification information and then use that information to steal a customer's identity. With the stolen identity, the imposter may then be able to withdraw cash or gain access to other customer accounts to make fraudulent charges. Another problem may include the risk of a bystander being enticed to follow a customer after an ATM transaction and either rob them of cash that was withdrawn, or force the customer to withdraw and turn over money as they may be able to see how much money is in the account.

In these exemplary use cases, it would be beneficial for users to be able to ensure that sensitive information displayed on an ATM screen remains private. According to one or more aspects of this disclosure, an ATM may survey and monitor those that are within the viewing sight of an ATM by capturing and processing images obtained by a camera. Surveying and monitoring an area may include gathering basic information, such as a number of people in the vicinity, or may include detailed information, such as what people are doing, the direction of their eyes, or even suspicious activity. When a customer engages with an ATM to complete bank transaction, the ATM may continue to monitor the people and surroundings along with a viewing angle of the customer. As the customer is engaging with the ATM, a camera is gathering and processing image data to determine what direction to project the customer's information. The direction may be based on viewing details of the customer's eyes, head level and tilt, or other gathered information. Based on the determined projection direction, the ATM may then display the customer's private information in a direction that is only viewable from the point-of-view or perspective of the customer. In addition, the ATM may also determine the direction that bystanders are looking based on gathering and processing image data related to the bystanders. Viewing angles may be established for each bystander and other information may be displayed to the bystanders, such as fake account information or a request to not view the private information of ATM users.

As shown in FIG. 1, an ATM display environment 100 is depicted according to one or more embodiments, and includes an ATM 102, a network 120, and a remote server 130. ATM 102 may be a device that allows account holder 124 to perform various banking transactions without the need for a human teller. These transactions typically include cash withdrawals, deposits, balance inquiries, fund transfers, or bill payments, etc. ATM 102 may be located in public places such as banks, shopping centers, airports, and convenience stores, to provide convenient access to banking services at any time of the day. As ATM 102 is typically found in highly trafficked areas, first bystander 122 and second bystander 126 may also be present with ATM display environment 100. Fewer or more bystanders may also be appreciated.

ATM 102 may include, for example, an image sensor 104, a graphical user interface 106, and a keypad 108. ATM 102 may also include a printer (not shown) for printing a receipt, a cash dispensary (not shown) for receiving and dispensing cash, and a network transmission device (not shown) for transmitting data, e.g., to a remote server 130 over network 120, the data of which will be described further below. The keypad 108 may be used by account holder 124 to enter information such as how much money to withdraw, a quantity of a type of currency to dispense, or a security code or personal identification number (PIN). Graphical user interface 106 may display information or instructions to account holder 124 and may also include buttons for receiving customer input. Graphical user interface 106 may display selections next to a corresponding button to allow account holder 124 to indicate a selection by pushing the corresponding button. Keypad 108 may also receive selected actions from account holder 124 such as in a situation where graphical user interface 106 displays a selection and a corresponding number to select on keypad 108. Other known methods for using graphical user interface 106 and keypad 108 for displaying information or receiving input from account holder 124 may also be included in other embodiments.

The image sensor 104 may be configured to capture images or video of ATM display environment 100. In ATM display environment 100, for example, image sensor 104 may capture video of first bystander 122, account holder 124, and second bystander 126. The video captured by image sensor 104 may be transmitted over network 120 to remote server 130 for processing and analyzing.

Image sensor 104 may capture a single image or a series of images for video recording. Image sensor 104 may include a built-in lens and utilize automatic focus settings for making adjustments related to exposure, focus, and white balance. Image sensor 104 may record in a variety of resolutions, such as 4K, and at different frame rates. Image sensor 104 may also integrate with a microphone (not pictured) that may record audio data that is linked to video data.

Image sensor 104 may also include infrared (IR) or LiDAR (Light Detection and Ranging) sensors improve video recording quality. Infrared sensors may use infrared radiation to detect objects invisible to the human eye, such as at night or in low light areas. LiDAR sensors may use laser pulses to measure distances of objects and generate 3D maps. Integration between these technologies may occur at the data processing and analysis stage, such as at remote server 130 and the combined data may provide richer insights or enhanced situational awareness. In one exemplary embodiment, image sensor 104 may always be recording. In another exemplary embodiment, image sensor 104 may be programmed to automatically begin and end recording based on a triggering event. Triggering events may be related to light sensitivity, movement, interaction with the interface 106 or keypad 108, or a date and time.

In FIG. 1, sight line 112, sight line 114, and sight line 116, depict a line of sight to first bystander 122, account holder 124, and second bystander 126, respectively. Line of sight may refer to the straight and unobstructed path that light or vision can travel between an observer and a target object. In this exemplary embodiment, line of sight may refer to the straight and unobstructed path that light from graphical user interface 106 travels between first bystander 122, account holder 124, or second bystander 126. Alternatively, line of sight may also refer to the straight line of vision from the eyes of first bystander 122, account holder 124, or second bystander 126, to graphical user interface 106.

Line of sight may be calculated using algorithms, including machine learning algorithms, and computer hardware usable to determine a line of sight. In this exemplary embodiment, images may be captured from image sensor 104. A processor may analyze the images to determine a line of sight to a person. As new images are updated, the processor may analyze the new image to determine a new line of sight. In this manner, constantly updated images may produce a constantly updated line of sight.

The graphical user interface 106 may include a screen configured to selectively output or limit output of content to one or more particular view angle. A viewing angle may be associated with a line of sight, as described above. For example, graphical user interface 106 may be composed of a multitude of small pixels, each capable of displaying different colors and shades. In addition, graphical user interface 106 may utilize an array of lenses and mirrors to split light into different directions. In so doing, graphical user interface 106 is able to project a first display of information to a first viewer and a second display of information to a second viewer by manipulating the light waves based on the different viewing angles of the first and second viewers.

A network transmission device (not shown) of the ATM 102 may enable wireless functionality. For example, image data may be transferred wireless from ATM 102 to remote server 130 over network 120. In response, remote server 130 may transmit instructional data back to ATM 102 over network 120. Other types and kinds of data may be transmitted over network 120 may also be appreciated.

Figure 2:
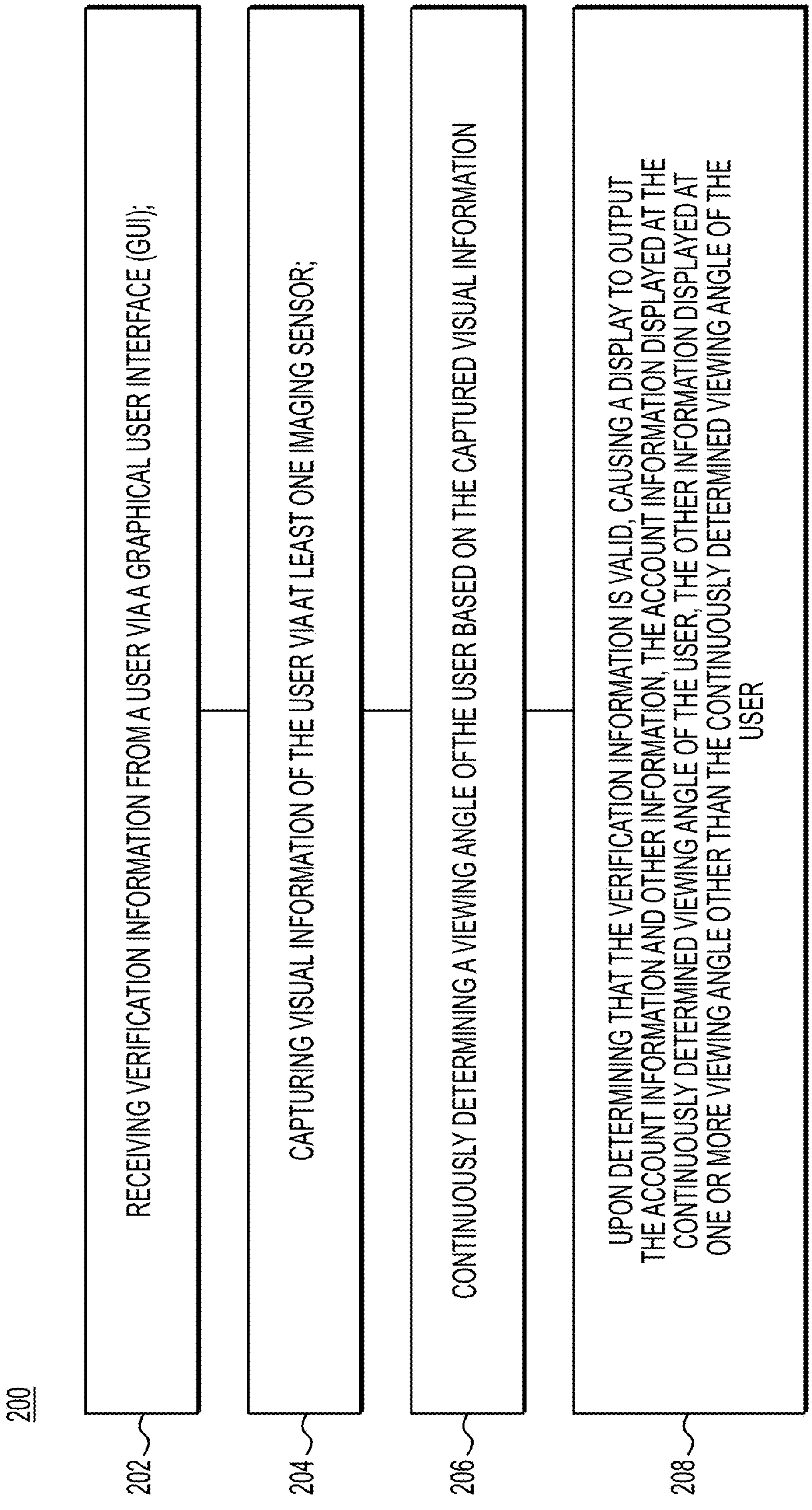
FIG. 2 depicts a flowchart of a method for displaying information, according to one or more embodiments.

FIG. 2 provides a flowchart depicting an exemplary method 200 for displaying information, according to one or more embodiments. In another embodiment, exemplary method 200 may be performed as part of a system for securely displaying account information that includes a data storage device with stored instructions for displaying account information in an electronic storage medium, an imaging sensor, a display, and a processor connected to the data storage device, the imaging sensor, and the display, and configured to execute the instructions to perform an exemplary method 200.

Step 202 may include receiving verification information from a user via a graphical user interface (GUI). In an exemplary embodiment, graphical user interface 106 may display instructions to account holder 124 wishing to perform a banking transaction. For example, graphical user interface 106 may request that account holder 124 insert a debit card and a corresponding PIN using keypad 108. The combination of the debit card and the entering of the correct PIN may be considered the verification information from the user.

Step 204 may include capturing visual information of the user via at least one imaging sensor. Picture images may be captured by image sensor 104 or image sensor 104 may capture video. The picture/video images may capture physical features of the user, and specifically the face or eyes of the user. This visual information may be stored and processed locally at ATM 102 or the visual information may be transmitted over network 120 to remote server 130 for processing or storage.

Step 206 may include continuously determining a viewing angle of the user based on the captured visual information. The viewing angle of the user may include a line of sight between the eyes of an account holder and the graphical user interface 106 of the ATM 102. Alternatively, the viewing angle may be more generalized to include a line of sight between general directions or objects, such as the head of an account holder 124 to the ATM 102 in general.

In one exemplary embodiment, based on images captured by image sensor 104 in step 204, the images are processed by a local server and processor, or a remote server 130, and a viewing angle or line of sight may be determined for each person present in ATM display environment 100. Each person proximate to the ATM, e.g., the account holder 124 and each bystander 122 and 126, may have a particular line of sight with the ATM.

The viewing angle or line of sight may be established for every person in ATM display environment 100 or may be determined for a portion of those that are present in ATM display environment 100. In one embodiment, line of sight may be determined by analyzing image data that includes first bystander 122, account holder 124, and second bystander 126. Sight line 112, sight line 114, and sight line 116, may be determined directly by determining a defined path from a point on ATM 102 to the eyes of first bystander 122, account holder 124, and second bystander 126. Alternatively, line of sight may be imputed based on other factors or in other situations. For example, if a direct path to the eyes of first bystander 122, account holder 124, or second bystander 126 doesn't exist, line of sight may refer to a line between ATM 102 and the head or upper torso of a potential observer.

Step 208 may include, upon determining that the verification information is valid, causing graphical user interface 106 to output the account information and other information, the account information displayed at the continuously determined viewing angle of the user, the other information displayed at one or more viewing angles other than the continuously determined viewing angle of the user. In an exemplary embodiment, the display that outputs the account information and other information may be a graphical user interface 106.

As mentioned above, the viewing angle of the user is continuously being calculated based on the visual data from the image sensor 104. Thus, if the viewing angle of the user changes, such as in a case where the user shifts positions or takes a step or two to the side, then the viewing angle of the user also changes and the information display is maintained at in the direction or viewing angle of the user. In one exemplary embodiment, the method may utilize graphics controller software to determine one or more emitting directions or emitting properties for each pixel of the graphical user interface 106 based on the continuously determined viewing angle of the user.

Figure 3:
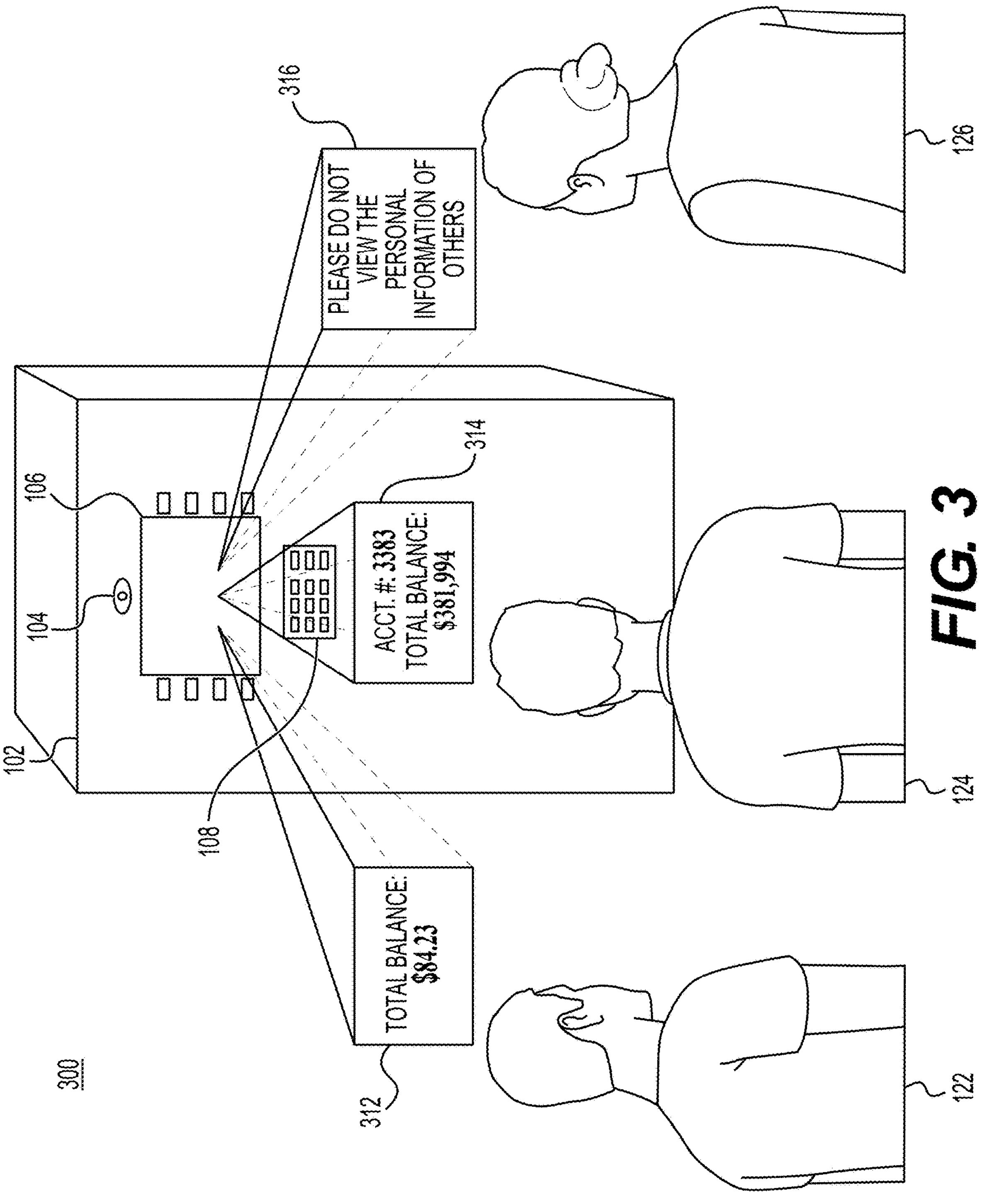
FIG. 3 depicts an exemplary an ATM display environment, according to one or more embodiments.

FIG. 3 depicts an ATM display environment 300 according to one or more embodiments. In an exemplary embodiment, as discussed above, account holder 124 may wish to perform a banking transaction using ATM 102. ATM 102 may be equipped with image sensor 104 that collects image data of ATM display environment 300. In one exemplary embodiment, image sensor 104 may be always on and continually surveying ATM display environment 300. In this example, image sensor 104 may be capturing image data that includes first bystander 122 and second bystander 126, as well as account holder 124. In alternative embodiment, image sensor 104 may be dormant until a triggering event occurs. One triggering event may include a motion sensor detecting the presence or motion of a person. Another triggering event may be when an individual interacts with ATM 102. In this example, account holder 124 may insert their debit card into ATM 102 and this may trigger image sensor 104 to begin capturing imaging data. In another exemplary embodiment, the triggering event may include a schedule. For example, image sensor 104 may be located in a convenient market, and may begin capturing data based on the market's hours of operation. Other known triggering methods may also be appreciated in other embodiments of the presented invention.

In this exemplary embodiment, account holder 124 may provide a debit card and PIN for authentication and during this process, image sensor 104 may capture image data. The image data may be analyzed either locally at ATM 102 or may be transmitted over network 120 to remote server 130 for processing. Processing the image data may determine account holder 124 along with first bystander 122 and second bystander 126. Determining bystanders versus an account holder may be determined by analyzing image data. For example, image data may include an individual inserting a debit card and punching in a PIN. This type of processing may provide an initial labeling of the account holder and everyone else bystanders.

In addition, an exemplary embodiment may include determining a line of sight that corresponds to first bystander 122, second bystander 126, and account holder 124, or sight line 112, sight line 116, and sight line 114 respectively as in FIG. 1. Determining the line of sight for each of first bystander 122, second bystander 126, and account holder 124, may be based on the captured image data, and determined using an algorithm or other software programming, or alternatively, may be determined using artificial intelligence, machine learning algorithms, or a neural network.

In one exemplary embodiment, a line of sight may be established by recognizing a person's eyes, face, or head and identifying the line of sight from the eyes, face, or head to the ATM. Alternatively, the line may be established to a specific point of ATM 102, such as the GUI, keypad, or other point on ATM 102.

In one exemplary embodiment, a line of sight may be determined for everyone present in ATM display environment 300. In another exemplary embodiment, a line of sight may be determined for only certain individuals. For example, a line of sight may only be determine for individuals where image sensor 104 detects eyes. In this example, if first bystander 122 turned their head and image sensor 104 is not able to detect the eyes of first bystander 122, the process may omit determining a line of sight between first bystander 122 and ATM 102.

In another embodiment, line of sight may only be determined for those that meet a certain threshold. A threshold may relate to distance. For example, a line of sight may only be determined for individuals that are within 20 feet of ATM 102. Alternatively, using a high definition camera, a threshold may related to the direction of an individual's retina. In this embodiment, processing high definition images may determine a focal direction of an individual based on their retina and calculate a chance or percentage that the individual is attempting to glean private information from ATM 102. In furthermore of this example, processing the data may determine a line of sight for those individuals that have a 50% chance or more of attempting to view private information.

In the exemplary embodiment of ATM display environment 300 the method may include determining the presence of account holder 124 and first bystander 122 and second bystander 126, based on the captured visual information, and a corresponding viewing angle for first bystander 122, account holder 124, and second bystander 126.

Upon determining that the verification information of account holder 124 is valid, the method may cause a display, such as graphical user interface 106, to output the account information and other information to account holder 124 at the continuously determined viewing angle of the account holder 124. Other information may be displayed along sight line 112 to first bystander 122 and sight line 116 to second bystander 126. In this exemplary embodiment, the output of the account information may be limited in a manner such that the account information is not visible at the viewing angles of first bystander 122 and second bystander 126. Thus, while account holder 124 is able to view the correct and private information relating to the account of account holder 124 other information may be displayed to and viewable by first bystander 122 and second bystander 126. In another exemplary embodiment, other information may be displayed at all other viewing angles other than the continuously determined viewing angle of account holder 124. In another exemplary embodiment, the account information may be identified as either private information or non-private information and limiting the output or displayed information to that of only private information.

Other information may include a message, false information, or truncated information. In one exemplary embodiment, an artificial intelligence/machine learning (AI/ML) model may be utilized to determine what type of information to display to non-account holders. Determining the other information to display may be based on a trained machine learning model that uses historical information to determine the other information that is predicted to minimize a risk of the user being targeted by a threatening individual. A trained machine learning model may use captured visual information, via an imaging sensor, to determining whether a person other than account holder 124 is predicted to be a threat. The trained machine learning model may also utilize learned or predetermined criteria to identify whether a bystander is a security threat. Predetermined criteria may include, but is not limited to, a number of times bystander glances in the direction of ATM 102 or graphical user interface 106, an amount of body fidgeting, an amount of time a bystander remains in the same body position or staring position, etc.

In another exemplary embodiment, an AI/ML model may determine that the other information to display should be false information such as a false name of the account holder, a false account number, or a reduced account balance of the user such as false information 312. Furthermore, the false information may be based on one or more predetermined criteria. For example, the type of false information may be based on the number of people present. An AI/ML model may determine that when there are more than 20 people in ATM display environment 300, a message may be displayed at other viewing angles other than the viewing angle of account holder 124. In another exemplary embodiment, a message may be specifically targeted at the viewing angles of specific bystanders, such as message 316 displayed to second bystander 126.

In another embodiment, the AI/ML model may decide the other information based on predetermined criteria such as time of day. In an exemplary embodiment, an algorithm may decide that between midnight and 8:00 am in the morning, the other information should include false information. In the exemplary embodiment, false information 312 may be displayed to first bystander 122. In another exemplary embodiment, other information may include truncated information or obfuscating information.

In another exemplary embodiment, it may be determined that certain information displayed to account holder 124 may also be truncated, while other information may be displayed in full depending on an amount of risk. In the exemplary embodiment, for example, it may be determined that an account number has a high risk because it may lead to fraudulent future transactions, whereas a total account balance may have less risk because it changes as account holder 124 makes deposits and withdrawals. Thus, in ATM display environment 300, account information 314 may include a truncated account number and a non-truncated total balance. In another embodiment the total balance may be obfuscated as it may be determined to be a high risk for robbery. The method may determine that not displaying a high total amount may decrease the risk of robbery, and may obfuscate that information. Other risk determinations related to types or kinds of information may also be determined and correspond to how or whether the information is displayed.

In another exemplary embodiment, the displayed output may include a request that the account holder 124 identify whether another individual captured by the imaging sensor is authorized to view the account information. For example, if a minor is accompanied by a parent, after the minor provides verification information, image sensor 104 may ask account holder 124 if second bystander 126 is also authorized to view the account information. Account holder 124 may provide, using graphical user interface 106 or keypad 108, an indication verifying that second bystander 126 is authorized to view the account information. With that indication, the method may include continuously determining the viewing angle of the second bystander 126 based on the captured visual information and causing the display to output the account information at the continuously determined viewing angle of second bystander 126.

In another exemplary embodiment, the output displayed at the continuously determined viewing angle of the account holder 124 may include instructions that describe a way to indicate that account holder 124 is in trouble or in danger. For example, the instructions may dictate that if account holder 124 is in trouble, they are to scratch their head with their right hand. Alternatively, the instructions may request that if account holder 124 is in danger, to press the top right button of the GUI. Based on the imaging sensor or GUI detecting the user completing the instruction, the method may include transmitting a silent alarm notification to an owner of the store, the owner of the ATM, or the police or local authorities.

Figure 4:
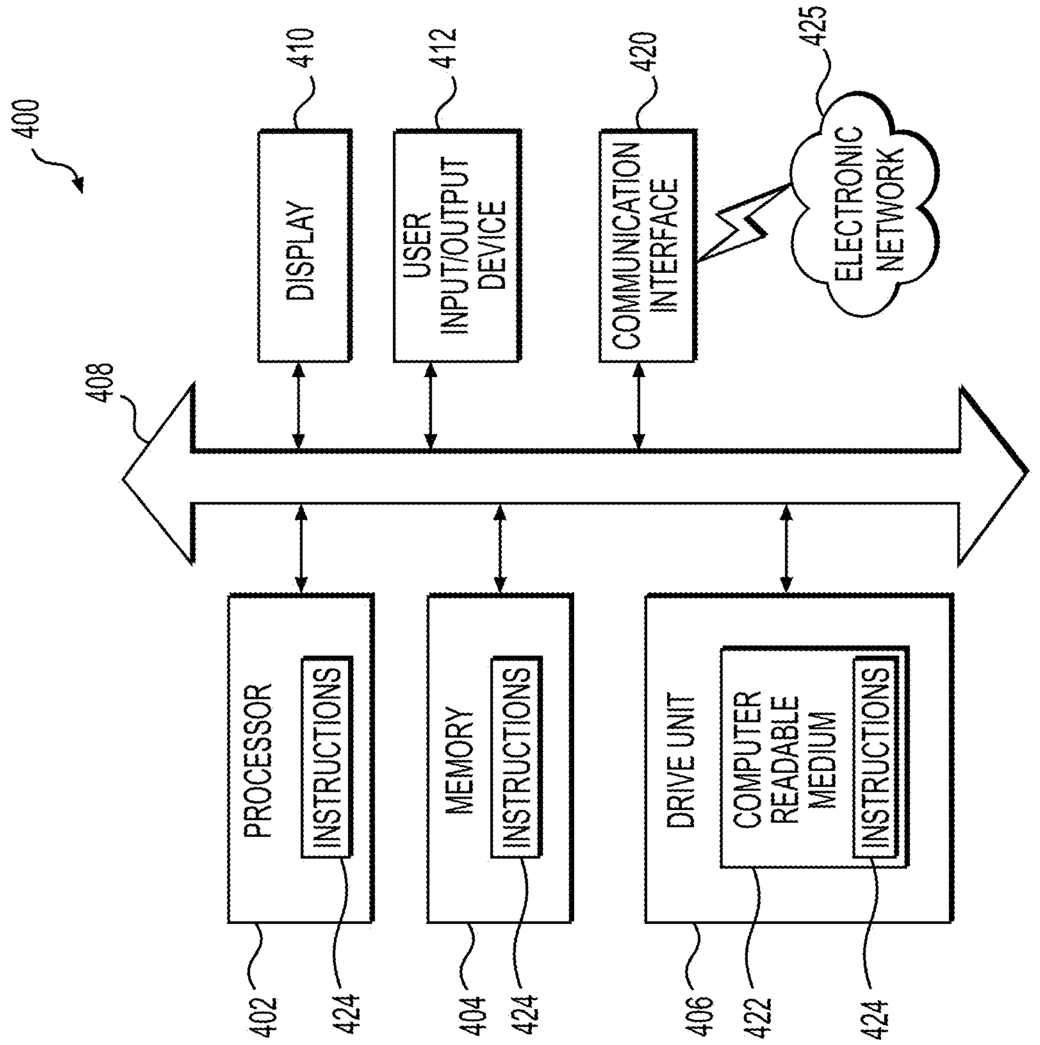
FIG. 4 depicts a block diagram of an exemplary computer 400, according to one or more embodiments.

FIG. 4 depicts a computer 400, such as a system or device implementing a process or operation in the examples above, and may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

FIG. 4 is a simplified functional block diagram of a computer 400 that may be configured as a device for executing processes or operations depicted in, or described with respect to, FIG. 1, according to exemplary embodiments of the present disclosure. For example, the computer 400 may be configured as a part of one of ATM 102 or remote server 130, or another device according to exemplary embodiments of this disclosure. In various embodiments, any of the systems herein may be a computer 400 including, e.g., a data communication interface 420 for packet data communication. The computer 400 may communicate with one or more other computers using the network 120. The network 120 may include a wired or wireless network similar to the network 120 depicted in FIG. 1.

The computer 400 also may include a central processing unit ("CPU"), in the form of one or more processors 402, for executing program instructions 424. The program instructions 424 may include instructions for running an application (e.g., if the computer 400 is a server for central hub 180). The computer 400 may include an internal communication bus 408, and a drive unit 406 (such as read-only memory (ROM), hard disk drive (HDD), solid-state disk drive (SDD), etc.) that may store data on a computer readable medium 422, although the computer 400 may receive programming and data via network communications. The computer 400 may also have a memory 404 (such as random access memory (RAM)) storing program instructions 424 for executing techniques presented herein, although program instructions 424 may be stored temporarily or permanently within other modules of computer 400 (e.g., one or more processors 402 or computer readable medium 422). The computer 400 also may include user input and output ports 412 or a display 410 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, e.g., may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be understood that embodiments in this disclosure are exemplary only, and that other embodiments may include various combinations of features from other embodiments, as well as additional or fewer features.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for securely displaying account information, the method comprising:

receiving verification information from a user via a graphical user interface (GUI);

capturing visual information of the user via at least one imaging sensor;

continuously determining a viewing angle of the user based on the captured visual information and relative to the graphical user interface;

determining, based on the captured visual information, a presence of at least one other individual and a viewing angle of the at least one other individual relative to the graphical user interface;

upon determining that the verification information is valid, causing a display to output the account information, the output limited to the continuously determined viewing angle by controlling individual pixels to emit light in different directions simultaneously, such that different images are visible from different viewing angles, the different directions based on the continuously determined viewing angle of the user and the viewing angle of the at least one other individual;

wherein the output includes a request that the user identify whether the at least one other individual is authorized to view the account information; and upon receiving, via the GUI, user input verifying that the at least one other individual is authorized to view the account information:

continuously determining a viewing angle, relative to the graphical user interface, of the at least one other individual based on the captured visual information; and causing the display to output the account information at the continuously determined viewing angle of the at least one other individual.

2. The method of claim 1, further comprising:

further limiting the output of the account information such that the account information is not visible at the viewing angle of the at least one other individual.

3. The method of claim 1, further comprising:

causing the display to output other information at viewing angles other than the continuously determined viewing angle of the user.

4. The method of claim 3, wherein the other information is false information, the false information determined based on one or more predetermined criteria.

5. The method of claim 4, wherein the false information comprises a false name of the user, a false account number, or a reduced account balance of the user.

6. The method of claim 3, wherein the other information includes truncated information or obfuscating information.

7. The method of claim 3, wherein the other information includes a message.

8. The method of claim 1, further comprising:

identifying whether the account information includes one or more of a first portion of non-private information or a second portion of private information; and wherein the output of the account information is limited to the second portion of private information.

9. The method of claim 1, further comprising:

determining, by a graphics controller software, at least one emitting direction and at least one emitting property for each pixel of the GUI, the at least one emitting direction and the at least one emitting property based on the continuously determined viewing angle of the user.

10. A method for securely displaying account information, the method comprising:

receiving verification information from a user via a graphical user interface (GUI);

capturing visual information of the user via at least one imaging sensor;

continuously determining a viewing angle of the user based on the captured visual information and relative to the graphical user interface; and upon determining that the verification information is valid, causing a display to output the account information and other information, the account information displayed at the continuously determined viewing angle of the user, the other information displayed at one or more viewing angles, relative to the graphical user interface, other than the continuously determined viewing angle of the user;

wherein causing the display to output the account information and the other information comprises controlling individual pixels to emit light in different directions simultaneously, such that different images are visible from different viewing angles;

wherein the other information is false information, the false information determined based on one or more predetermined criteria.

11. The method of claim 10, further comprising:

determining a presence of at least one other individual, based on the captured visual information;

determining viewing angle of the at least one other individual; and further limiting the output of the account information such that the account information is not visible at the viewing angle of the at least one other individual.

12. The method of claim 10, wherein the false information comprises a false name of the user, a false account number, or a reduced account balance of the user.

13. The method of claim 10, wherein the other information includes a message.

14. The method of claim 10, wherein the output displayed at the continuously determined viewing angle of the user comprises instructions to the user; and based on the at least one imaging sensor or GUI detecting the user completing the instruction, transmitting a silent alarm notification.

15. The method of claim 10, further comprising:

determining a presence of an individual other than the user, based on the captured visual information, wherein the output includes a request that the user identify whether the individual captured by the at least one imaging sensor is authorized to view the account information; and upon receiving, via the GUI, user input verifying that the individual is authorized to view the account information:

continuously determining a viewing angle of the individual based on the captured visual information; and causing the display to output the account information at the continuously determined viewing angle of the individual.

16. The method of claim 10, further comprises:

determining, by a trained machine learning model, the other information to display based on historical information, wherein the other information is predicted to minimize a risk of the user being targeted by a threatening individual.

17. The method of claim 10, further comprising:

based on the captured visual information via the at least one imaging sensor, determining a person other than the user, based on predetermined criteria, is predicted to be a threat.

18. A system for securely displaying account information, the system comprising:

a data storage device storing instructions for displaying account information in an electronic storage medium;

at least one imaging sensor;

a display; and a processor operatively connected to the data storage device, the at least one imaging sensor, and the display, and configured to execute the instructions to perform a method including:

receiving, at a graphical user interface (GUI) of the display, verification information from a user;

capturing, by the at least one imaging sensor, visual information of the user;

continuously determining, by the processor, a viewing angle of the user based on the captured visual information and relative to the graphical user interface; and upon determining that the verification information is valid, causing the GUI to output the account information and other information, the account information displayed at the continuously determined viewing angle of the user, the other information displayed at one or more viewing angles, relative to the graphical user interface, other than the continuously determined viewing angle of the user;

wherein causing the display to output the account information and the other information comprises controlling individual pixels to emit light in different directions simultaneously, such that different images are visible from different viewing angles;

wherein the other information is false information, the false information determined based on one or more predetermined criteria.

19. The system for securely displaying account information of claim 18, wherein the method further comprises:

determining a presence of at least one other individual, based on the captured visual information;

determining viewing angle of the at least one other individual; and further limiting the output of the account information such that the account information is not visible at the viewing angle of the at least one other individual.

20. The system for securely displaying account information of claim 18, wherein the false information comprises a false name of the user, a false account number, or a reduced account balance of the user.

* * * * *